United States Patent
Fan et al.

(10) Patent No.: US 8,249,010 B2
(45) Date of Patent: Aug. 21, 2012

(54) METHOD AND APPARATUS FOR FEEDING BACK AND RECEIVING ACKNOWLEDGEMENT INFORMATION OF SEMI-PERSISTENT SCHEDULING DATA PACKETS

(75) Inventors: Xiaoan Fan, Shenzhen (CN); Guang Liu, Shenzhen (CN); Bo Li, Shenzhen (CN); Yunzhe Hou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 12/610,618

(22) Filed: Nov. 2, 2009

(65) Prior Publication Data

US 2010/0111024 A1    May 6, 2010

Related U.S. Application Data

(63) Continuation of application No. PCT/CN2009/071486, filed on Apr. 27, 2009.

(30) Foreign Application Priority Data

Nov. 5, 2008 (CN) .......................... 2008 1 0217254

(51) Int. Cl.
    *H04H 20/67* (2008.01)
(52) U.S. Cl. ........... 370/329; 370/336; 370/400; 455/68
(58) Field of Classification Search ............... 370/329, 370/336, 400; 455/68
See application file for complete search history.

(56) References Cited

U.S. PATENT DOCUMENTS

| | | | |
|---|---|---|---|
| 7,373,148 B2 | 5/2008 | Kim et al. | |
| 7,493,117 B2 | 2/2009 | Cai et al. | |
| 7,912,007 B2 | 3/2011 | Fan et al. | |
| 7,979,784 B2 * | 7/2011 | Shao et al. | ...... 714/807 |
| 2004/0202140 A1 | 10/2004 | Kim et al. | |
| 2006/0252439 A1 | 11/2006 | Cai | |
| 2007/0147333 A1 | 6/2007 | Makhijani | |
| 2008/0175195 A1 | 7/2008 | Cho et al. | |
| 2008/0192674 A1 | 8/2008 | Wang et al. | |
| 2008/0273513 A1 | 11/2008 | Montojo et al. | |
| 2009/0257408 A1 | 10/2009 | Zhang et al. | |
| 2009/0290538 A1 | 11/2009 | Kim et al. | |

(Continued)

FOREIGN PATENT DOCUMENTS

CN      1551677 A      12/2004

(Continued)

OTHER PUBLICATIONS

3GPP TSG RAN WGl Meeting #54bis Prague, Czech Republic, Sep. 29-Oct. 3, 2008 R1-084059.*

(Continued)

*Primary Examiner* — Sai-Ming Chan
(74) *Attorney, Agent, or Firm* — Huawei Technologies Co., Ltd.

(57) ABSTRACT

The present invention relates to radio communications, and discloses a method and apparatus for feeding back and receiving acknowledgment (ACK) information of semi-persistent scheduling (SPS) data packets. The method for feeding back ACK information of SPS data packets includes: receiving an uplink downlink assignment index (UL DAI) from a base station (BS), where the value of the UL DAI indicates the number of downlink data packets (N); mapping ACKs/NAKs of k SPS data packets of the downlink data packets to positions from the (N−k+1)th ACK/NAK to the $N^{th}$ ACK/NAK; and feeding back N ACKs/NAKs to the BS. This method can guarantee that N ACKs/NAKs are arranged correctly.

13 Claims, 6 Drawing Sheets

U.S. PATENT DOCUMENTS

| | | | |
|---|---|---|---|
| 2010/0027446 | A1 | 2/2010 | Choi et al. |
| 2010/0027447 | A1 | 2/2010 | Choi et al. |
| 2010/0034158 | A1* | 2/2010 | Meylan .................. 370/329 |
| 2010/0040005 | A1 | 2/2010 | Kim et al. |
| 2010/0210256 | A1 | 8/2010 | Shen et al. |

FOREIGN PATENT DOCUMENTS

| | | |
|---|---|---|
| CN | 101114868 A | 1/2008 |
| CN | 101212251 A | 7/2008 |
| CN | 101296061 A | 10/2008 |
| KR | 10-2008-0092222 A | 10/2008 |
| WO | WO 2004/100590 A1 | 11/2004 |
| WO | WO 2007/072341 A2 | 6/2007 |
| WO | WO 2008/127015 A1 | 10/2008 |

OTHER PUBLICATIONS

Written Opinion of the International Searching Authority, PCT/CN2009/071486, dated Aug. 13, 2009, 3 pages.

3GPP TSG-RAN-WG1 Meeting #53bis, "Implicit mapping between CCE and PUCCH for ACK/NACK TDD," R1-082359, Warsaw Poland, Jun. 30, Jul. 4, 2008, 4 pages.

Classon, B., "Huawei LTE and LTE-A contributions for RAN1#55," XP-002636808, Nov. 4, 2008, 4 pages.

3GPP TSG-RAN-WG1 Meeting #55, "Remaining Issues of ACK/NAK Multiplexing on PUSCH," R1-084344, Prague CZ, Nov. 10-Nov. 14, 2008, 4 pages.

3GPP TS 36.213 V8.5.0 (Dec. 2008), "3$^{rd}$ Generation Partnership Project; Technical Specification Group Radio Access Network; Evolved Universal Terrestrial Radio Access (E-UTRA); Physical layer procedures (Release 8)," Dec. 2008, 74 pages.

Extended European Search Report, Application No./Patent No. 09733661.4-2415/2234303 PCT/CN2009/071486, May 31, 2011, 9 pages.

Korean Office Action, Application No. 10-2010-7012083, dated Jun. 22, 2011, 5 pages.

Nokia Siemens Networks, "Way Forward on Remaining Issues for TDD ACK/NAK Transmission on PUSCH", 3GPP Publication R1-084059, Sep. 29-Oct. 3, 2008, 3 pages, 3GPP TSG RAN WG1 Meeting #54bis, Prague, Czech Republic.

Wang, et al. U.S. Appl. No. 60/889,148, entitled "Method and Apparatus for Acknowledgement Signaling", filed Feb. 9, 2007 (35 pages).

Kim, H. S., et al., U.S. Appl. No. 61/046,777, entitled "New PUCCH Index Generation," filed Apr. 21, 2008 (15 pages).

Kim, H. S., U.S. Appl. No. 61/073,034, entitled "Correction of PUCCH Index Generation," filed Jun. 17, 2008 (22 pages).

Kim, H. S., U.S. Appl. No. 61/088,343, entitled "Shortened Scheduling Request," filed Aug. 12, 2008 (10 pages).

Kim, H. S., et al., U.S. Appl. No. 61/090,610, entitled "Shortened SR and Related UL Configurations," filed Aug. 20, 2008 (11 pages).

Accelerated Examination Support Document, U.S. Appl. No. 12/830,246, filed Jul. 2, 2010, 46 pages.

First office action of corresponding European Patent Application No. 09733661.4, mailed on Mar. 13, 2012, 8 pages total.

Derk Visser: "The Annotated European Patent Convention", H. Tel, Weldhoven, Netherlands, Vol., dated 2007, 4 pages total.

First office action of corresponding Japanese Patent Application No. 2010536315 mailed on Jan. 10, 2012, and English translation thereof, 4 pages total.

TSG-RAN WG1 #55 R1-084334: "Channel Models for LTE-Advanced Evaluations", CMCC, Elektrobit, ETRI, GATT, Huawei, RITT, Qualcomm Europe, Vodafone, Motorola, Prague, Czech Republic, dated Nov. 10-14, 2008, 3 pages total.

Search report issued in corresponding PCT patent application No. PCT/CN2009/071486, dated Aug. 13, 2009, total 3 pages.

* cited by examiner

… (1)

METHOD AND APPARATUS FOR FEEDING BACK AND RECEIVING ACKNOWLEDGEMENT INFORMATION OF SEMI-PERSISTENT SCHEDULING DATA PACKETS

CROSS-REFERENCE TO RELATED APPLICATIONS

This application is a continuation of International Application No. PCT/CN2009/071486, filed on Apr. 27, 2009, which claims priority to Chinese Patent Application No. 200810217254.3, filed on Nov. 5, 2008, both of which are hereby incorporated by reference in their entireties.

FIELD OF THE INVENTION

The disclosure relates to radio communications, and in particular, to a method and apparatus for feeding back and receiving acknowledgement information of semi-persistent scheduling data packets.

BACKGROUND OF THE INVENTION

Two modes are supported in the prior 3GPP E-UTRA system: frequency division duplex (FDD) and time division duplex (TDD). In TDD mode, the length of each radio frame is 10 ms and is composed by two 5 ms length half-frames. Each half-frame is composed by eight 0.5 ms timeslots and three special fields, namely, downlink pilot timeslot (DwPTS), guard period (GP) and uplink pilot timeslot (UpPTS). Two timeslots form a sub-frame, and the DwPTS, GP, and UpPTS form a special sub-frame. The length of a sub-frame is 1 ms.

Currently, two modes are available to feed back an acknowledgment or negative acknowledgment (ACK/NAK) of multiple downlink sub-frames in an uplink sub-frame in the 3GPP E-UTRA system: multiplexing and bundling. In multiplexing mode, if the ACK/NAK is fed back in a physical uplink control channel (PUCCH), the feedback is related to the uplink-downlink configuration; if the ACK/NAK is fed back in a physical downlink shared channel (PDSCH), the number of bits fed back depends on whether an uplink grant (UL Grant) signaling exists. If the UL Grant signaling exists, the number of bits that the user equipment (UE) is required to feed back is specified through an uplink data assignment indicator (UL DAI) field in the signaling. If a base station (BS) schedules x of the total N downlink sub-frames, the UE feeds back x ACKs/NAKs; if no UL Grant signaling exists, the UE feeds back N bits and a NAK to those non-scheduled downlink sub-frames.

In bundling mode, only 1-bit ACK/NAK information is fed back, in the PUCCH or in the PUSCH, to indicate the details of all the scheduled downlink sub-frames. So long as the feedback to a scheduled downlink sub-frame is a NAK, the final feedback is a NAK. The final feedback is an ACK only when feedbacks to all the scheduled downlink sub-frames are ACKs.

Two data scheduling modes are defined in the current Long Term Evolution (LTE) protocol: dynamic scheduling and semi-persistent scheduling (SPS). In dynamic scheduling mode, each new data packet has a control signaling—physical downlink control channel (PDCCH) to indicate resources and transmission mode. The UE receives downlink data and transmits uplink data according to the PDCCH delivered by the BS. In SPS mode, the BS sends a PDCCH control signaling only when the SPS transmission is activated. The UE activates the SPS transmission according to the position and time indicated by the PDCCH. The UE transmits and receives new data packets in a certain period until another PDCCH in a special format terminates the SPS transmission.

Because the PDCCH is used for notification in both dynamic scheduling and semi-persistent scheduling modes, the UE differentiates whether the scheduling mode is dynamic scheduling or semi-persistent scheduling by different scrambled IDs in a cyclic redundancy check (CRC) of the PDCCH. In dynamic scheduling mode, the CRC of the PDCCH is scrambled with a cell radio network temporary identifier (C-RNTI); in semi-persistent scheduling mode, the CRC of the PDCCH is scrambled with an SPS-C-RNTI. When the UE detects the PDCCH scrambled with the SPS-C-RNTI, the UE activates the semi-persistent transmission, and receives or transmits data according to the indication in the PDCCH. Within the subsequent period of time, the UE receives and transmits data only according to the position indicated by the PDCCH when the semi-persistent transmission is activated for the first time, making it unnecessary to notify the UE of the position of SPS data packet resources through the PDCCH each time. When the position of SPS resources needs to be changed, a new PDCCH may be used to replace the previous semi-persistent scheduling configuration until the semi-persistent transmission is cancelled by a PDCCH scrambled with an SPS-C-RNTI in a special format when the period of SPS data expires.

However, in uplink ACK/NAK multiplexing mode in the prior art, the first position of K ACKs/NAKs fed back by the UE is the ACK/NAK of the SPS sub-frame, and the position of the UL ACK/NAK of other sub-frames is arranged in the sequence of a downlink data assignment indicator (DL DAI). If the UE does not detect any data in the sub-frames, the UE feeds back a NAK. When the UE loses the SPS activation signaling, the UE feeds back a NAK at the first position. Based on the NAK, the BS thinks that the control signaling is received properly but data is wrong, thus receiving incorrect ACK information. As a result, the BS does not retransmit a PDCCH, and the UE still does not know the position of the semi-persistent transmission, which causes unnecessary retransmission.

SUMMARY OF THE INVENTION

One objective of embodiments of the present invention is to provide a method and apparatus for feeding back ACK information of SPS data packets so that the ACK information of downlink data can be fed back properly.

Another objective of embodiments of the present invention is to provide a method and apparatus for receiving ACK information of SPS data packets so that the ACK information of downlink data can be received properly.

To achieve the preceding objectives, embodiments of the present invention provide the following technical solution: A method for feeding back ACK information of SPS data packets includes: receiving a UL DAI from a BS, where the value of the UL DAI indicates the number of downlink data packets (N); mapping ACKs/NAKs of k SPS data packets of the downlink data to positions from the (N−k+1)th ACK/NAK to the Nth ACK/NAK; and feeding back N ACKs/NAKs to the BS.

To achieve the preceding objectives, embodiments of the present invention provide the following technical solution: A method for receiving ACK information of SPS data packets includes: sending a UL DAI to a UE, where the value of the UL DAI indicates the number of downlink data packets (N); and receiving N ACKs/NAKs fed back by the UE, among which the positions from the (N−k+1)th ACK/NAK to the Nth ACK/NAK are used for mapping k SPS data packets of the downlink data.

To achieve the preceding objectives, embodiments of the present invention provide the following technical solution: An apparatus for feeding back ACK information of SPS data packets includes: a receiving unit, adapted to receive a UL DAI from a BS, where the value of the UL DAI indicates the number of downlink data packets (N); a processing unit, adapted to map ACKs/NAKs of k SPS data packets of the downlink data to positions from the (N−k+1)th ACK/NAK to the Nth ACK/NAK; and a feedback unit, adapted to feed back N ACKs/NAKs to the BS.

To achieve the preceding objectives, embodiments of the present invention provide the following technical solution: An apparatus for receiving ACK information of SPS data packets includes: a sending unit, adapted to send a UL DAI to a UE, where the value of the UL DAI indicates the number of downlink data packets (N); and a receiving unit, adapted to receive N ACKs/NAKs fed back by the UE, among which the positions from the (N−k+1)th ACK/NAK to the Nth ACK/NAK are used for mapping k SPS data packets of the downlink data.

Compared with the prior art, embodiments of the present invention have the following differences and benefits: The ACKs/NAKs of k SPS data packets of the downlink data are mapped to positions from the (N−k+1)th ACK/NAK to the Nth ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of the SPS data packets of the downlink data are mapped at the Nth ACK/NAK for feedback, N ACKs/NAKs can be arranged correctly. Furthermore, when the BS receives the ACK information of N ACKs/NAKs that are arranged correctly, unnecessary data retransmissions may be reduced, thus saving resources.

DETAILED DESCRIPTION OF THE INVENTION

For better understanding of the objectives, technical solutions and merits of the present invention, the following describes the present invention in detail with reference to the accompanying drawings and exemplary embodiments.

Figure 1:
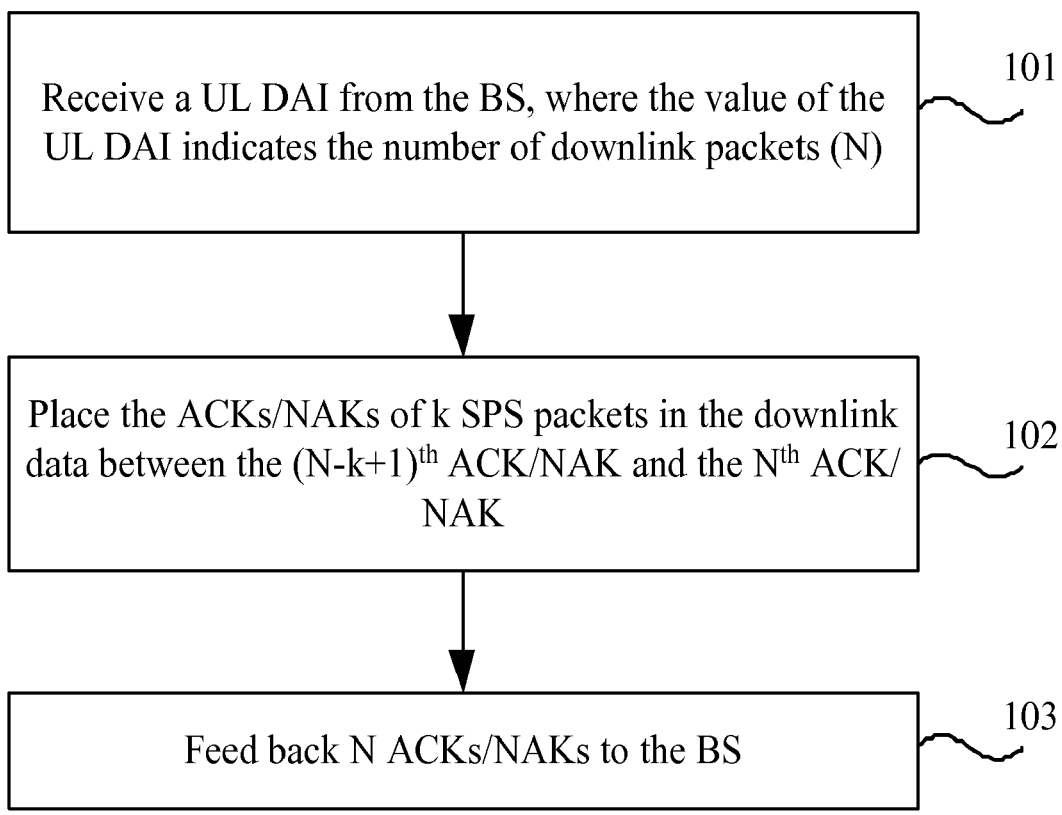
FIG. 1 is a flowchart of a method for feeding back ACK information of SPS data packets in an embodiment of the present invention.

FIG. 1 is a flowchart of a method for feeding back ACK information of SPS data packets in an embodiment of the present invention. As shown in FIG. 1, the method includes the following steps.

Step 101: Receive a UL DAI from the BS, where the value of the UL DAI indicates the number of downlink data packets (N).

Step 102: Map the ACKs/NAKs of k SPS data packets of the downlink data to positions from the (N−k+1)th ACK/NAK to the Nth ACK/NAK, where k is a positive integer greater than 0.

Step 103: Feed back N ACKs/NAKs to the BS.

The mapping the ACKs/NAKs of k SPS data packets of the downlink data to positions from the (N−k+1)th ACK/NAK to the Nth ACK/NAK of step 102 includes: mapping the ACKs/NAKs of k SPS data packets of the downlink data to positions from the (N−k+1)th ACK/NAK to the Nth ACK/NAK in positive or negative sequence.

Step 102 further includes: mapping the ACKs/NAKs of non-SPS data packets of the downlink data to positions from the first ACK/NAK among N ACKs/NAKs. Specifically, the step includes: receiving a DL DAI from the BS, where the value of the DL DAI indicates that the downlink data packet is the Mth non-SPS data packet of the downlink data packets; and mapping the ACK/NAK of the Mth non-SPS data packet at the position of the Mth ACK/NAK.

In this embodiment, the ACKs/NAKs of k SPS data packets of the downlink data are mapped to positions from the (N−k+1)th ACK/NAK to the Nth ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data are mapped to positions from the (N−k+1)th ACK/NAK to the Nth ACK/NAK, N ACKs/NAKs can be arranged correctly.

Figure 2:
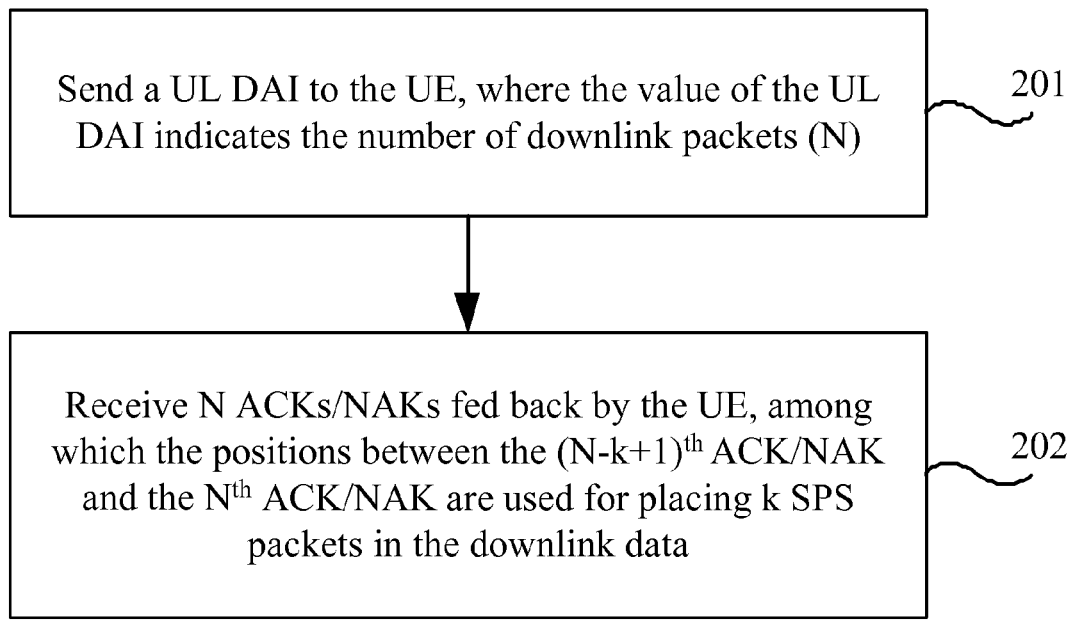
FIG. 2 is a flowchart of a method for receiving ACK information of SPS data packets in an embodiment of the present invention.

FIG. 2 is a flowchart of a method for receiving ACK information of SPS data packets in an embodiment of the present invention. As shown in FIG. 2, the method includes the following steps.

Step 201: Send a UL DAI to the UE, where the value of the UL DAI indicates the number of downlink data packets (N).

Step 202: Receive N ACKs/NAKs fed back by the UE, among which the positions from the (N−k+1)th ACK/NAK to the Nth ACK/NAK are used for mapping k SPS data packets of the downlink data.

In step 202, when the BS receives a feedback NAK to the SPS activation sub-frame, another SPS activation signaling is transmitted at the next time of semi-persistent transmission or at the time of SPS retransmission. The transmitted signaling is the same as or different from the SPS activation signaling.

The step of mapping the ACKs/NAKs of non-SPS data packets of the downlink data to positions from the first ACK/NAK among N ACKs/NAKs in step 202 includes: sending a DL DAI to the UE, where the value of the DL DAI indicates that the downlink data packet is the Mth non-SPS data packet of the downlink data packets; and receiving M ACKs/NAKs from the UE, among which the ACK/NAK of the Mth non-SPS data packet is mapped at the position of the Mth ACK/NAK.

The ACKs/NAKs of k SPS data packets of the downlink data are mapped to positions from the (N−k+1)th ACK/NAK to the Nth ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data are mapped to positions from the (N−k+1)th ACK/NAK to the Nth ACK/NAK, N ACKs/NAKs can be arranged correctly. Thus, when the BS receives N ACKs/NAKs that are arranged correctly, unnecessary data retransmissions may be reduced, thus saving resources. The preceding embodiment is based on the TDD mode. The TDD mode has the following features: Sub-frames 0 and 5 must be downlink sub-frames; sub-frame 2 must be an uplink sub-frame; the DwPTS may transmit downlink data or not transmit data; the rest of sub-frames may be assigned as uplink or downlink sub-frames flexibly.

TABLE 1

Assignment ratio of uplink sub-frames to downlink sub-frames in the TDD system

| Uplink-downlink sub-frames configuration | Sub-Frame No. | | | | | | | | | |
|---|---|---|---|---|---|---|---|---|---|---|
| | 0 | 1 | 2 | 3 | 4 | 5 | 6 | 7 | 8 | 9 |
| 3:1 (5 ms) | D | S | U | U | U | D | S | U | U | U |
| 2:2 (5 ms) | D | S | U | U | D | D | S | U | U | D |
| 1:3 (5 ms) | D | S | U | D | D | D | S | U | D | D |
| 3:6 (10 ms) | D | S | U | U | U | D | D | D | D | D |
| 2:7 (10 ms) | D | S | U | U | D | D | D | D | D | D |
| 1:8 (10 ms) | D | S | U | D | D | D | D | D | D | D |
| 5:3 (10 ms) | D | S | U | U | U | D | S | U | U | D |

As shown in Table 1, seven uplink-to-downlink assignment ratios are defined in the 3GPP E-UTRA system, including four assignment ratios for the period of 5 ms, namely, 1:3, 2:2, 3:1, and 3:5, and three assignment ratios for the period of 10 ms, namely, 6:3, 7:2, and 8:1. Except the assignment ratios of 1:3 and 3:5, the assignment ratios may cause the following result: ACKs/NAKs of N (greater than 1) downlink sub-frames need to be fed back in an uplink sub-frame.

Taking the assignment ratio of 2:2 as an example, when the DwPTS transmits downlink data, the ACK/NAK feedbacks to the downlink sub-frames should be assigned to the downlink sub-frames evenly. Thus, one of two uplink sub-frames must feed back ACKs/NAKs of two downlink sub-frames. These N downlink sub-frames may be dynamic scheduling sub-frames or SPS sub-frames. The BS may schedule one or multiple downlink sub-frames of N downlink sub-frames. For example, it may schedule only one downlink sub-frame or all of the N downlink sub-frames, which is determined by the scheduler of the BS according to services. The dynamic scheduling is random scheduling, in which only one downlink sub-frame can be scheduled once. The BS may dynamically schedule any downlink sub-frame. A PDCCH is required in the dynamic scheduling of each downlink sub-frame. The SPS is a mode in which multiple downlink sub-frames are scheduled by period. Except that a PDCCH is required in the SPS of the first downlink sub-frame, no PDCCH is required in the subsequent SPS of downlink sub-frames.

The 3GPP LTE technology defines a series of requirements to avoid HARQ interaction errors. The requirements are as follows.

1. A 2-bit UL DAI is used in the UL Grant to indicate the number of scheduled PDSCH sub-frames of the UE. The PDSCH sub-frames include dynamic sub-frames and SPS sub-frames. In certain cases, for example, to determine the number of SPS sub-frames, the value of the UL DAI may include the number of non-SPS sub-frames only. In these cases, the UE obtains the number of PDSCH sub-frames (N) by counting the sum of the number of SPS sub-frames and the number of non-SPS sub-frames indicated by the UL DAI, where N indicates the number of uplink ACKs/NAKs that the UE needs to feed back.

2. A 2-bit DL DAI is used in the DL Grant to indicate the current number of PDSCH sub-frames assigned to the UE. In ACK/NAK multiplexing mode, the DL DAI counts only the number of PDSCH sub-frames assigned to the UE until the current time by using a counter, without counting the number of SPS sub-frames. The SPS sub-frames may be sub-frames that carry downlink SPS data without resource scheduling index signaling or sub-frames that carry downlink SPS data and SPS override PDCCH. The SPS sub-frames may also be sub-frames that carry downlink SPS data and include sub-frames carrying the SPS activation signaling PDCCH and sub-frames of the SPS override PDCCH.

3. In uplink ACK/NAK multiplexing mode, the first position among N ACKs/NAKs fed back by the UE is the ACK/NAK of the SPS sub-frame. The UL ACKs/NAKs of other sub-frames are arranged according to the sequence of the DL DAI.

4. If the UE does not detect any data in the sub-frames, the UE feeds back a NAK.

In uplink ACK/NAK multiplexing mode in the prior art, the first position of N ACKs/NAKs that the UE feeds back according to the UL DAI is the ACK/NAK of the SPS sub-frame. The ACKs/NAKs of other sub-frames are arranged according to the sequence of the DL DAI. If the UE does not detect any data in the sub-frames, the UE feeds back a NAK. Thus, when the SPS activation PDCCH is missing, errors may occur in UL ACK/NAK multiplexing feedback because the UE cannot differentiate whether the sub-frame is a dynamic sub-frame or an SPS sub-frame.

Figure 3:
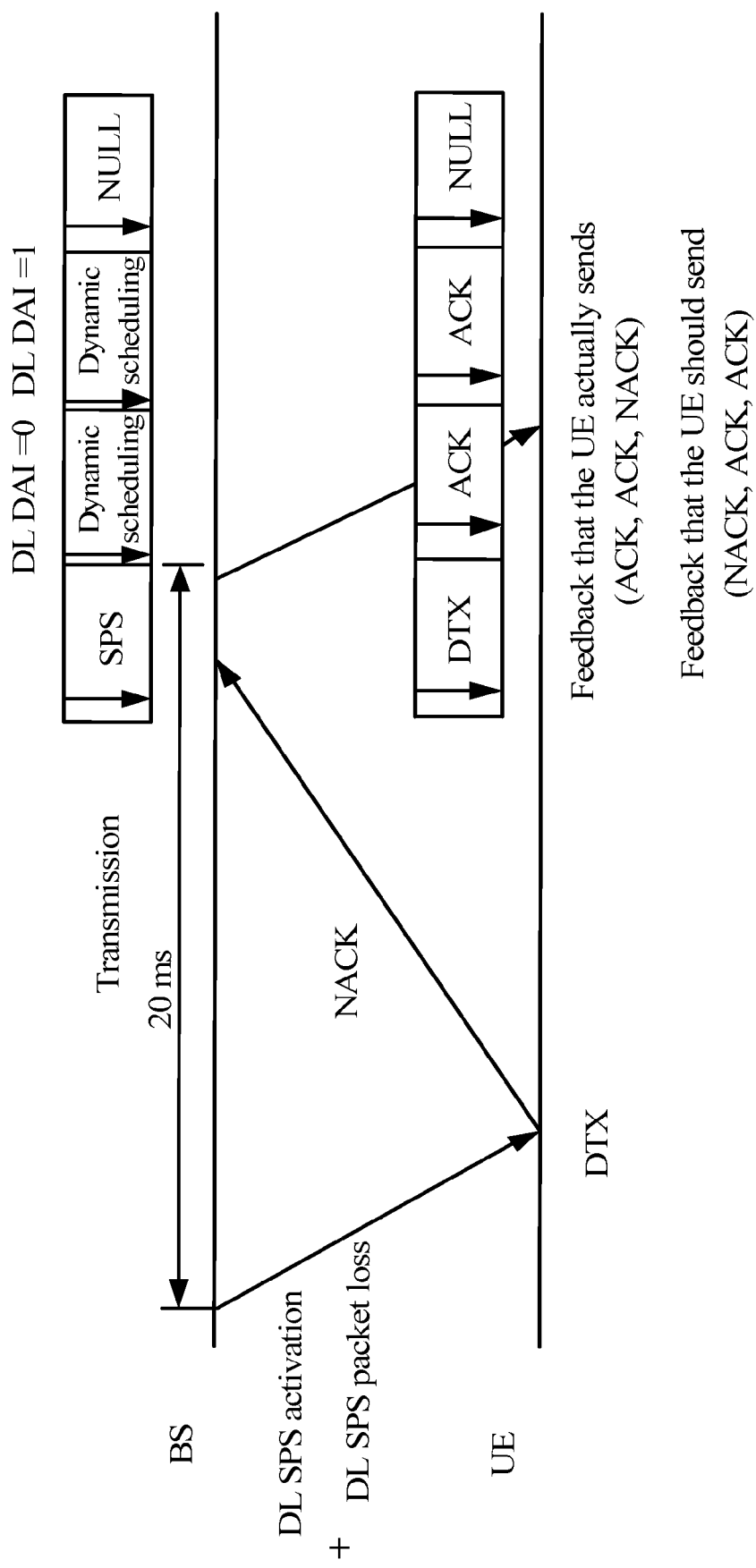
FIG. 3 is a schematic drawing illustrating the receiving of SPS sub-frames in a method for receiving ACK information of SPS data packets in another embodiment of the present invention.

FIG. 3 is a schematic drawing illustrating the receiving of SPS sub-frames in a method for receiving ACK information of SPS data packets in another embodiment of the present invention. As shown in FIG. 3, the SPS transmission is activated by the DL Grant signaling. The frequency resources indicated by the DL Grant carry semi-persistent transmission data packets. If the UE does not receive the DL Grant signaling, it should feed back DTX, which means no data is received, but the UE feeds back a NAK actually. The BS does not know that the NAK indicates the UE receives the DL Grant signaling, or indicates the UE receives the DL Grant signaling but errors occur during the detection of SPS data packets. If the BS believes that the NAK indicates that the UE receives the DL Grant signaling, it thinks that the SPS resources are already activated, and sends new SPS data packets after a certain period. Because the DL Grant is unavailable in SPS mode, the UE cannot obtain correct SPS data within a certain period. As shown in Table 1, supposing when the BS retransmits SPS data packets, the assignment ratio of uplink sub-frames to downlink sub-frames is 1:3, the first sub-frame carries semi-persistent data packets and the second and third sub-frames are dynamic scheduling sub-frames, the values of the DL DAIs in the DL Grants of the second and third sub-frames should be 0 and 1, and the value of the DAI in the UL Grant of the uplink sub-frame is 3. When the UE receives the four downlink sub-frames, supposing the second sub-frame is received correctly, the third sub-frame is also received correctly. When the UE gives feedback in the uplink, it does not think that the first sub-frame is an SPS sub-frame because the DAI of the UL Grant is 3, the DL DAI of the DL Grant of the received second sub-frame is 0, and the UE does not receive the SPS activation PDCCH. This is caused by the requirement in the prior art that the ACK/NAK of the SPS sub-frame must be fixed at the first position of the multiplexing group. Thus, the UE feeds back an ACK, an ACK and a NAK, but the BS expects the UE to feed back a NAK, an ACK, and an ACK. This is caused by the difference between judgments of the BS and the UE about whether the first sub-frame is an SPS sub-frame. Further, the UE does not receive the SPS activation signaling, but the BS thinks that the UE receives the SPS activation signaling. As a result, the UE feeds back a NAK to the SPS data packets within the SPS duration, and the BS does not retransmit the PDCCH. Thus, the UE does not know the position of the semi-persistent transmission, which causes unnecessary retransmissions.

This embodiment provides an improved solution for overcoming the weaknesses of the prior art, in which when the BS retransmits SPS data packets, the assignment ratio of uplink sub-frames to downlink sub-frames is 1:3; and feedback errors occurs when the ACKs/NAKs of the SPS sub-frames must be fixed at the first position of the multiplexing group (N ACKs/NAKs). The improved solution is as follows: When the UL ACK/NAK multiplexing is performed on the uplink ACKs/NAKs associated with the SPS downlink sub-frames, the uplink ACKs/NAKs are fixed at the last position in the multiplexing group (N ACKs/NAKs) for transmission.

If the DwPTS can also carry downlink data, four downlink sub-frames and one uplink sub-frame are available within 5 ms. If three downlink sub-frames are scheduled for the user, the first one of these three downlink sub-frames is an SPS sub-frame and the second and third ones carry downlink dynamic scheduling data. In this case, the UL DAI may count the total number of scheduled downlink sub-frames of the user. The value of the UL DAI is equal to 3. Because the first downlink sub-frame is an SPS sub-frame, the DL DAI parameter is not counted in the SPS sub-frame. The second downlink sub-frame is dynamic scheduling data, the DL DAI of which is equal to 0. The third downlink sub-frame is also a dynamic scheduling data sub-frame, the DL DAI of which is equal to 1. If the UE loses the semi-persistent transmission data packet (downlink sub-frame 1) and activation DL Grant of the semi-persistent transmission but receives dynamic scheduling data of other sub-frames, the UE cannot know that the first downlink sub-frame is an SPS sub-frame. The UE determines that three UL ACKs/NAKs need to be fed back based on the fact that the UL DAI is equal to 3. Because the DL DAI of the second downlink sub-frame is equal to 0, the UE may misunderstand that the second downlink sub-frame is the first downlink sub-frame scheduled by the BS, and then feed back an ACK at the first position in the multiplexing group (N ACKs/NAKs). According to the fact that the DL DAI is equal to 1 at the third downlink sub-frame, the UE determines that the third downlink sub-frame is the second scheduled downlink sub-frame, and feeds back an ACK at the second position in the multiplexing group (N ACKs/NAKs). Because no data is detected at the fourth downlink sub-frame, the UE may determine that the fourth downlink sub-frame does not receive the third scheduled sub-frame, and then feed back a NAK at the third position in the multiplexing group. Thus, the UE feeds back an ACK, an ACK, and a NAK. According to this embodiment, when the UL ACK/NAK multiplexing is performed on the uplink ACKs/NAKs associated with the SPS downlink sub-frames, the uplink ACKs/NAKs are fixed at the last position in the multiplexing group for transmission. That is, the UE maps the ACKs/NAKs of the SPS sub-frames at the third position among the three ACKs/NAKs. Thus, the BS should receive the feedbacks ACK, ACK, and NAK. In this case, the sequence of ACKs/NAKs that the UE sends is the same as that of ACKs/NAKs that the BS should receive.

In addition, in this embodiment, if the BS receives a feedback of a NAK to the SPS activation sub-frame, the BS transmits one more PDCCH the same as the SPS activation PDCCH in the next period of semi-persistent data transmission, or retransmits a PDCCH the same as the SPS activation PDCCH at the position for SPS sub-frame retransmission. The UE transmits or receives SPS data according to resources indicated by the PDCCH, and activates the SPS transmission.

This embodiment maps the ACKs/NAKs of SPS data packets of the downlink data at the position of the third ACK/NAK for feedback. Thus, when the SPS activation PDCCH signaling is missing, the UE cannot differentiate whether the sub-frames are dynamic scheduling sub-frames or SPS sub-frames. If the ACKs/NAKs of the SPS data packets of the downlink data are mapped at the position of the third ACK/NAK for feedback, the three ACKs/NAKs can be arranged correctly. In addition, this embodiment takes only the assignment ratio of 1:3 as an example. Other six assignment ratios are also applicable to the present invention, and will not be further described.

Furthermore, when the SPS transmission is normally activated, a new DL Grant may be used to replace the previous SPS configuration when the period of SPS data expires. When a sub-frame of the override PDCCH is counted into the DL DAI and the ACK/NAK associated with the SPS sub-frame needs to be mapped at the first position in the ACK/NAK multiplexing group, errors may occur if the PDCCH of the sub-frame is missing.

Figure 4:
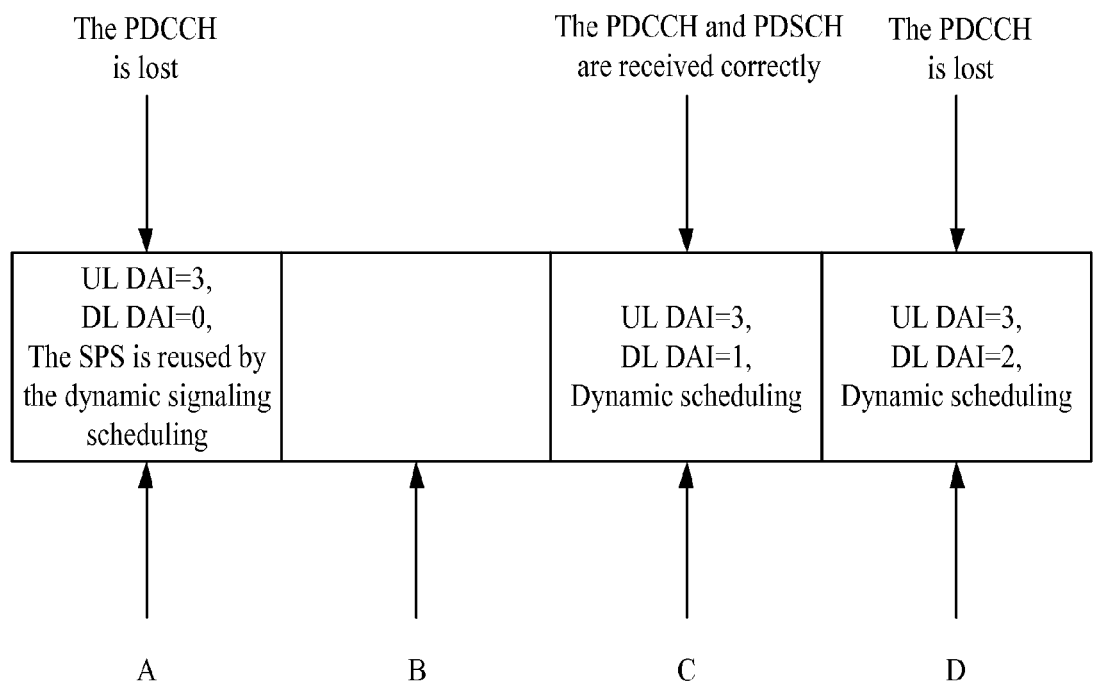
FIG. 4 is a schematic drawing illustrating the receiving of SPS sub-frames in a method for receiving ACK information of SPS data packets in another embodiment of the present invention.

FIG. 4 is a schematic drawing illustrating the receiving of SPS sub-frames in a method for receiving ACK information of SPS data packets in another embodiment of the present invention. As shown in FIG. 4, the BS schedules three downlink sub-frames for the UE based on the assignment ratio of 1:3. In this case, the UL DAI is equal to 3. Sub-frame A is an SPS override sub-frame. Thus, the DL DAI of the SPS override sub-frame is equal to 0. Sub-frames C and D are dynamic scheduling sub-frames, and their DL DAIs are equal to 1 and 2. When the SPS override PDCCH occurs at sub-frame A, only sub-frame C can be received if the PDCCHs of sub-frame A and D are missing. In this case, the UE knows that the UL DAI and DL DAI of sub-frame C are equal to 3 and 1. However, the UE does not know that sub-frame A is an SPS override sub-frame. Instead, the UE thinks that sub-frame A is still an SPS sub-frame that is not counted in the DL DAI. Thus, the UE may misunderstand that sub-frame B is used as the sub-frame of which the DL DAI is equal to 0. As a result, when the ACKs/NAKs associated with the SPS sub-frames are fixed at the first position in the multiplexing group, the UE feeds back a NAK, a NAK and an ACK, but the BS should receive the feedbacks NAK, ACK and NAK.

This embodiment provides an improved solution for overcoming the weaknesses of the prior art, in which the ACKs/NAKs of the SPS sub-frames are fixed at the first position in the multiplexing group for feedback; and feedback errors occur when the override PDDCH signaling of the SPS sub-frames is missing. The improved solution is as follows: When the assignment ratio of the uplink sub-frames to the downlink sub-frames is 1:3, four downlink sub-frames and one uplink sub-frame are available within the period of 5 ms if the DwPTS can carry downlink data. When the UL ACK/NAK multiplexing is performed on the uplink ACKs/NAKs associated with the SPS downlink sub-frames, the uplink ACKs/NAKs are fixed at the last position in N ACKs/NAKs for transmission; that is, these ACKs/NAKs are fixed at the third position. In this case, the BS should receive the feedbacks NAK, ACK and NAK. According to the fact that the DL DAI and UL DAI of sub-frame C are 1 and 3, the UE may misunderstand that sub-frame B is a dynamic scheduling sub-frame and feed back a NAK to sub-frame B, and that sub-frame A is an SPS sub-frame and feed back a NAK to sub-frame A at the last position in the UL ACK/NAK multiplexing group. The UL ACKs/NAKs of other sub-frames are arranged according to the sequence of the DL DAI. The UE feeds back a NAK, an ACK and a NAK. In this case, the sequence of feedbacks that the UE actually sends is the same as that of feedbacks that the BS should receive.

This embodiment maps the ACKs/NAKs of SPS data packets of the downlink data at the position of the third ACK/NAK for feedback. Thus, when the override PDCCH signaling of the SPS sub-frames is missing, the UE cannot differentiate whether the sub-frames are dynamic scheduling sub-frames or SPS sub-frames. If the ACKs/NAKs of the SPS data packets of the downlink data are mapped at the position of the third ACK/NAK for feedback, the sequence of feedbacks that the UE actually sends is the same as that of feedbacks that the BS should receive. In addition, this embodiment takes only the assignment ratio of 1:3 as an example. Other six assignment ratios are also applicable to the present invention, and will not be further described.

Figure 5:
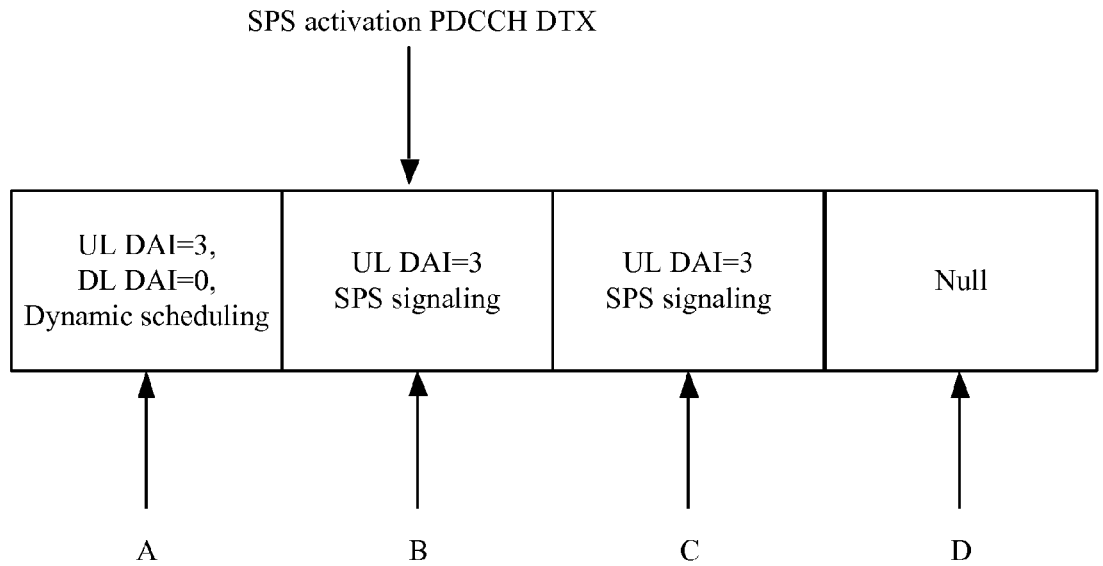
FIG. 5 is a schematic drawing illustrating the receiving of SPS sub-frames in a method for receiving ACK information of SPS data packets in another embodiment of the present invention.

The embodiment shown in FIG. 3 is based on the fact that the SPS activation PDCCH of an SPS sub-frame is missing. However, the number of transmitted SPS sub-frames is not limited to 1 in this embodiment. This embodiment supposes there are two SPS sub-frames, among which the SPS activation PDCCH of one SPS sub-frame is missing, and the other SPS sub-frame is transmitted normally. FIG. 5 is a schematic drawing illustrating the receiving of SPS sub-frames in a method for receiving ACK information of SPS data packets in another embodiment of the present invention. As shown in FIG. 5, sub-frame B is the SPS sub-frame of which the SPS activation PDCCH is missing and sub-frame C is the SPS sub-frame that is normally transmitted without DL Grant. Errors may occur if the ACKs/NAKs of the SPS data packets of the downlink data are mapped at the position of the first ACK/NAK for feedback. The specific analysis is as follows: The BS schedules three downlink sub-frames for the UE, and the UL DAI is equal to 3. Sub-frame A carries dynamic scheduling data. In this case, the DL DAI is equal to 0, and the UE receives the sub-frame and feeds back an ACK. The UE does not receive the SPS activation PDCCH at the position of sub-frame B. Thus, the UE does not think that sub-frame B is an SPS sub-frame, but misunderstands that sub-frame B is a dynamic scheduling sub-frame. As a result, the UE feeds back a NAK at the third position. Sub-frame C is an SPS sub-frame that is normally transmitted without DL Grant. The UE receives the sub-frame and should feed back an ACK at the first position. In fact, the UE feeds back an ACK, an ACK and a NAK. The BS should receive the feedbacks NAK, ACK and ACK. In this case, the sequence of feedbacks that the UE actually sends is different from that of feedbacks that the BS should receive.

To solve this problem, this embodiment arranges the ACKs/NAKs associated with the SPS sub-frames behind dynamic sub-frames in a certain sequence when the UL ACK/NAK multiplexing is performed on the uplink ACKs/NAKs associated with the SPS downlink sub-frames. According to this embodiment, the DL DAI of sub-frame A is equal to 0, and sub-frame A is a dynamic scheduling sub-frame with the feedback ACK, where the ACK should be mapped at the position of the first ACK/NAK. Sub-frame B is an SPS sub-frame to which a NAK should be fed back; sub-frame C is an SPS sub-frame to which an ACK should be fed back at the position of the third ACK/NAK. The positions of ACKs/NAKs of the SPS sub-frames are arranged according to the arrival sequence of sub-frames B and C. The BS should receive the feedbacks ACK, NAK and ACK. According to the fact that the DL DAI and UL DAI of sub-frame A are equal to 0 and 3, the UE may determine that sub-frame A is a dynamic scheduling sub-frame and feed back an ACK at the first position because the DL DAI is equal to 0. Because the PDCCH of sub-frame B is missing, the UE may misunderstand that sub-frame B is a dynamic scheduling sub-frame, and feed back a NAK at the second position of the UL ACK/NAK. Sub-frame C is an SPS sub-frame and is received correctly. In this case, an ACK is mapped at the last position. In fact, the UE feeds back an ACK, a NAK and an ACK. In this case, the sequence of feedbacks that the UE actually sends is the same as that of feedbacks that the BS should receive.

This embodiment maps the ACKs/NAKs of two SPS data packets of the downlink data at the positions of the second and third ACKs/NAKs for feedback. Thus, when the SPS activation PDCCH signaling is missing, the UE cannot differentiate whether the sub-frames are dynamic scheduling sub-frames or SPS sub-frames. If the ACKs/NAKs of the SPS data packets of the downlink data are mapped at the positions of the second and third ACKs/NAKs for feedback, the three ACKs/NAKs can be arranged correctly. In addition, this embodiment takes only two SPS data packets as an example. More than two SPS data packets may also be applicable to the present invention. This embodiment is based on the condition that the SPS activation PDCCH signaling is missing. The following conditions are also applicable to the present invention: The SPS activation PDCCH signaling is missing and the normal SPS data packet is missing, which will not be further described. Furthermore, this embodiment takes only the assignment ratio of 1:3 as an example. Other six assignment ratios are also applicable to the present invention, and will not be further described.

Figure 6:
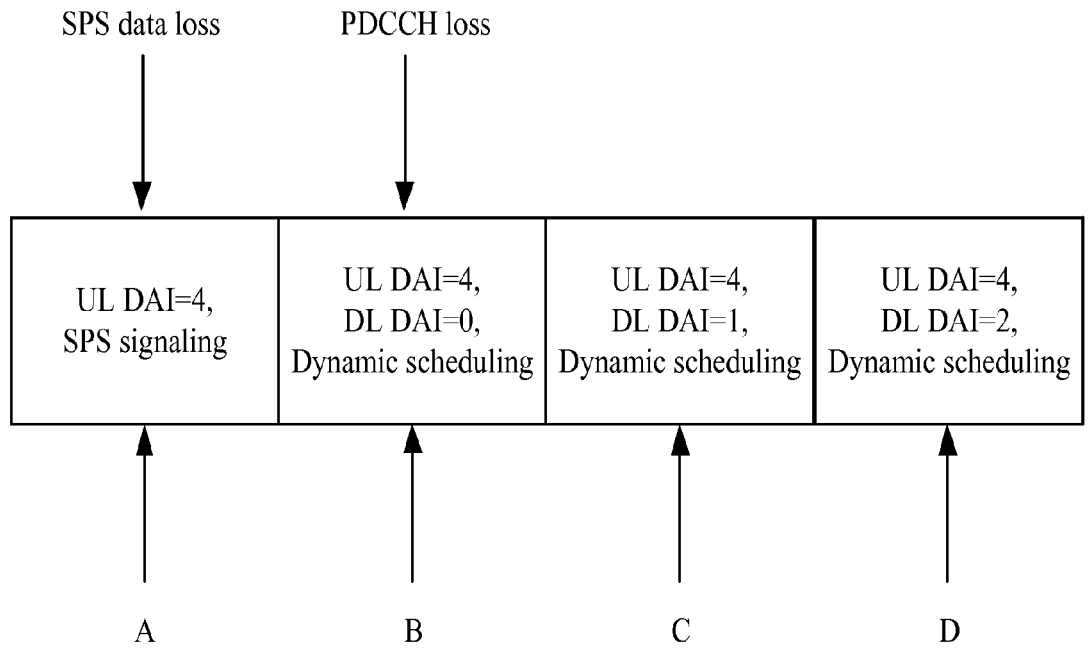
FIG. 6 is a schematic drawing illustrating the receiving of SPS sub-frames in a method for receiving ACK information of SPS data packets in another embodiment of the present invention.

The preceding embodiments are based on the condition that the BS has scheduled three downlink sub-frames for the UE. The method for receiving ACK information of SPS data packets in another embodiment of the present invention is based on the following conditions: The assignment ratio of uplink sub-frames to downlink sub-frames is 1:3; four downlink sub-frames are available within the period of 5 ms; the BS schedules four downlink sub-frames for the UE; and when the semi-persistent transmission begins, the transmission of SPS sub-frame data packets fails and the PDCCHs of dynamic sub-frames are missing. FIG. 6 is a schematic drawing illustrating the receiving of SPS sub-frames in a method for receiving ACK information of SPS data packets in another embodiment of the present invention. As shown in FIG. 6, if the DwPTS can carry downlink data, four downlink sub-frames and one uplink sub-frame are available within the period of 5 ms. When the semi-persistent transmission begins, the UE receives semi-persistent transmission data sub-frames at a fixed time within a certain period if the transmission of SPS sub-frame data packet A fails and the PDCCH of dynamic sub-frame B is missing. When the UL ACK/NAK multiplexing is performed on the uplink ACKs/NAKs associated with the SPS downlink sub-frames, the uplink ACKs/NAKs are fixed at the last position in the multiplexing group for transmission. The UE knows that sub-frame A is an SPS sub-frame and detects that sub-frame A data is missing. Then, the UE feeds back a NAK. The UE does not detect any PDCCH in sub-frame B. The UE detects data in sub-frame C, and deduces that sub-frame B loses a dynamic data scheduling sub-frame according to the fact that the DL DAI is equal to 1. The UE detects that sub-frame D is correct and has a feedback ACK. Because the UL DAI is equal to 4, the UE needs to feed back four ACKs/NAKs. According to the arrangement sequence of the DL DAI and the method for mapping SPS sub-frames at the last position, the UE gives feedbacks as follows: NAK, ACK, ACK, and NAK. However, the BS should receive the feedbacks NAK, ACK, ACK and NAK. Thus, the sequence of feedbacks that the UE actually sends is the same as that of feedbacks that the BS should receive.

Figure 7:
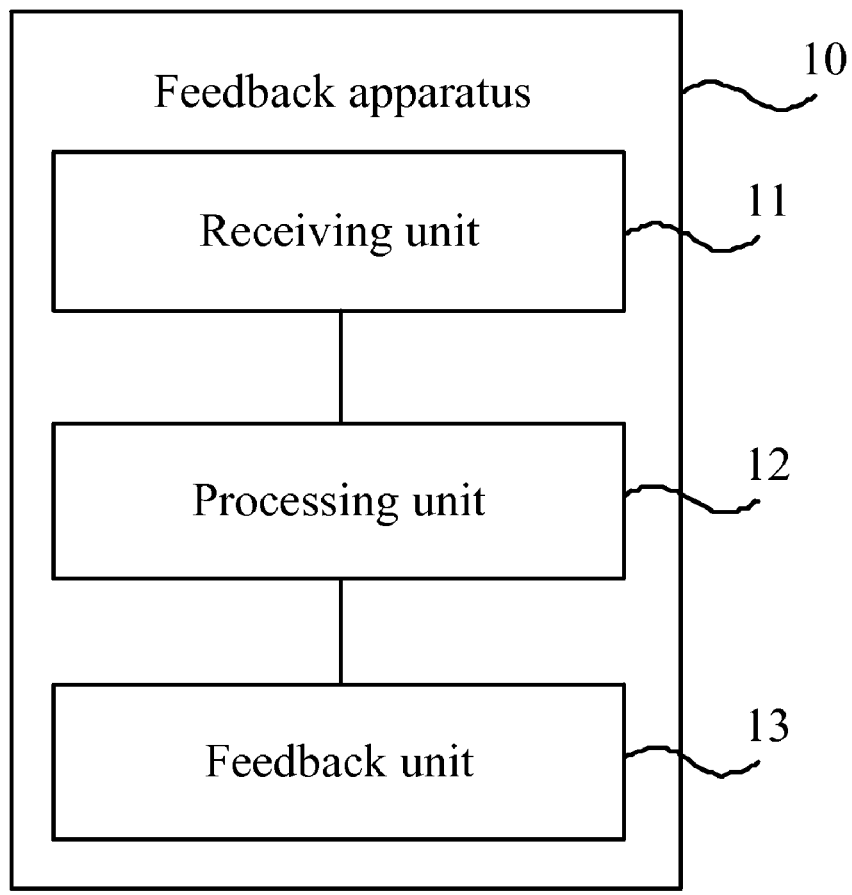
FIG. 7 shows a structure of an apparatus for feeding back ACK information of SPS data packets in an embodiment of the present invention.

FIG. 7 shows a structure of an apparatus for feeding back ACK information of SPS data packets in an embodiment of the present invention. As shown in FIG. 7, the feedback apparatus 10 includes: a receiving unit 11, adapted to receive a UL DAI from the BS, where the value of the UL DAI indicates the number of downlink data packets (N); a processing unit 12, adapted to map the ACKs/NAKs of k SPS data packets of the downlink data to positions from the (N−k+1)th ACK/NAK to the Nth ACK/NAK; and a feedback unit 13, adapted to feed back N ACKs/NAKs to the BS. The processing unit 12 is further adapted to map the ACKs/NAKs of non-SPS data packets of the downlink data to positions from the first ACK/NAK among N ACKs/NAKs. The process is as follows: receiving a DL DAI from the BS, where the value of the DL DAI indicates that the downlink data packet is the Mth non-SPS downlink data packet; and mapping the ACK/NAK of the Mth non-SPS data packet at the position of the Mth ACK/NAK.

In addition, the processing unit 12 may map the ACKs/NAKs of k SPS data packets of the downlink data to positions from the (N−k+1)th ACK/NAK to the Nth ACK/NAK in positive or negative sequence. The details are given in the third to sixth embodiments of the present invention, and will not be further provided.

This embodiment maps the ACKs/NAKs of k SPS data packets of the downlink data to positions from the (N−k+1)th ACK/NAK to the Nth ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data are mapped to positions from the (N−k+1)th ACK/NAK to the Nth ACK/NAK, N ACKs/NAKs can be arranged correctly.

Figure 8:
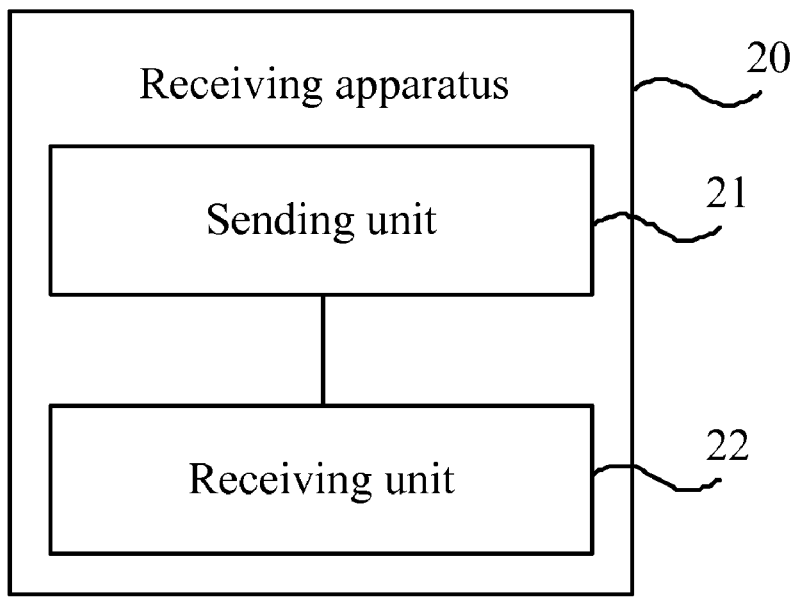
FIG. 8 shows a structure of an apparatus for receiving ACK information of SPS data packets in an embodiment of the present invention.

FIG. 8 shows a structure of an apparatus for receiving ACK information of SPS data packets in an embodiment of the present invention. As shown in FIG. 8, the receiving apparatus includes: a sending unit 21, adapted to send a UL DAI to the UE, where the value of the UL DAI indicates the number of downlink data packets (N); and a receiving unit 22, adapted to receive N ACKs/NAKs fed back by the UE, among which the positions from the (N−k+1)th ACK/NAK to the Nth ACK/NAK are used for mapping k SPS data packets of the downlink data. When the receiving unit 22 receives a feedback NAK to an SPS activation sub-frame, the sending unit is further adapted to transmit one more SPS activation signaling at the next time of semi-persistent transmission, or transmit one more SPS activation signaling at the time of SPS retransmission, where the retransmitted signaling is the same as or different from the SPS activation signaling. In addition, the ACKs/NAKs of non-SPS data packets of the downlink data are mapped to positions from the first position of N ACKs/NAKs in the receiving unit 22. The process is as follows: sending a DL DAI to the UE, where the value of the DL DAI indicates that the downlink data packet is the Mth non-SPS downlink data packet; and receiving M ACKs/NAKs fed back by the UE, among which the Mth non-SPS data packet is mapped at the position of the Mth ACK/NAK. The details are given in the preceding method embodiments.

Embodiments of the present invention map the ACKs/NAKs of k SPS data packets of the downlink data to positions from the (N−k+1)th ACK/NAK to the Nth ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data are mapped to positions from the (N−k+1)th ACK/NAK to the Nth ACK/NAK, N ACKs/NAKs can be arranged correctly. Thus, when the BS receives ACK information of N ACKs/NAKs that are arranged correctly, unnecessary data retransmissions may be reduced, thus saving resources.

Through the preceding description of embodiments, it is understandable to those skilled in the art that embodiments of the present invention may be implemented by hardware or software in combination with a necessary hardware platform. Thus, the technical solution of the present invention may be made into software. The software may be stored in a non-volatile storage medium (for example, a CD-ROM, a USB flash disk, and a mobile hard disk), and include several instructions that enable a computer device (PC, server, or network device) to perform the methods provided in each embodiment of the present invention.

Although the present invention has been described through some exemplary embodiments and accompanying drawings, the invention is not limited to such embodiments. It is apparent that those skilled in the art can make various modifications and variations to the invention without departing from the spirit and scope of the invention.

The invention claimed is:

1. A method for a base station to receive acknowledgement (ACK) information of semi-persistent scheduling (SPS) data packets, comprising:
   sending an plink data assignment indicator (UL DAI) to a User Equipment (UE), wherein the UL DAI indicates a number (N) of downlink data packets sent to the UE, wherein the number N is larger than one, and wherein a number k (k<N) of the downlink data packets is/are SPS data packets; and
   receiving from the UE a feedback signal comprising N acknowledgements/negative acknowledgements (ACKs/NAKs) acknowledging the N downlink data packets starting from the first ACK/NAK at the first position, wherein k ACKs/NAKs of the k SPS data packets is/are placed from (N−k+1)th to Nth positions of the N ACKs/NAKs.

2. The method of claim 1, further comprising:
   transmitting an SPS activation signaling at a next time of semi-persistent transmission or at a time of SPS retransmission in response to receiving a NAK feedback to an SPS activation sub-frame.

3. The method of claim 1, wherein N−k ACKs/NAKs of non-SPS data packets of the downlink data packets is/are placed from the first position of the N ACKs/NAKs.

4. The method of claim 3, further comprising:
   sending a downlink data assignment indicator (DL DAI) to the UE, wherein the DL DAI indicates that a downlink data packet is a Mth non-SPS data packet of the downlink data packets (M≧N−k);
   wherein the received feedback signal comprises N−k ACK/NAKs of the non-SPS data packets, an acknowledgement of the Mth non-SPS data packet is placed at the Mth position of the N ACKs/NAKs.

5. The method of claim 1, wherein the positions from the (N−k+1)th ACK/NAK to the Nth ACK/NAK are used for arranging the acknowledgement of k SPS data packets of the downlink data packets in a positive sequence or a negative sequence or according to an arrival sequence of the SPS data packets.

6. A base station, comprising:
   a sending unit, configured to send an uplink data assignment indicator (UL DAI) to a user equipment (UE), wherein the UL DAI indicates a number (N) of downlink data packets sent to the UE; wherein the number N is larger than one, and wherein a number k (k<N) of the downlink data packets is/are semi-persistent scheduling (SPS) data packets; and
   a receiving unit, configured to receive from the UE a feedback signal comprising N acknowledgements/negative acknowledgements (ACKs/NAKs) acknowledging the N downlink data packets starting from the first ACK/NAK at the first position, wherein k ACKs/NAKs of the k SPS data packets is/are placed from (N−k+1)th to Nth positions of the N ACKs/NAKs.

7. The base station of claim 6, wherein the sending unit is further configured to transmit a SPS activation signaling, and wherein when the receiving unit receives a feedback NAK, the sending unit is further configured to transmit one more SPS activation signaling at a next time of semi-persistent transmission, or transmit one more SPS activation signaling at a time of SPS retransmission, wherein the retransmitted SPS activation signaling is the same as or different from the SPS activation signaling.

8. The base station of claim 6, wherein N−k ACKs/NAKs of non-SPS data packets of the downlink data packets is/are placed from the first position of the N ACKs/NAKs.

9. The base station of claim 6, wherein k=1.

10. The method of claim 1, wherein k=1.

11. A non-transitory computer readable storage medium storing program codes thereon for use by a base station, wherein the program codes comprise:
    instructions for sending an uplink data assignment indicator (UL DAI) to a user equipment (UE), wherein the UL DAI indicates a number (N) of downlink data packets sent to the UE, wherein the number N is larger than one, and wherein a number k (k downlink data packets is/are semi-persistent scheduling (SPS) data packets; and
    instructions for receiving from the UE a feedback signal comprising N acknowledgements/negative acknowledgements (ACKs/NAKs) acknowledging the N downlink data packets starting from the first ACK/NAK at the first position, wherein k ACKs/NAKs of the k SPS data packets is/are placed from (N−k+1)th to Nth positions of the N ACKs/NAKs.

12. The computer program product of claim 11, wherein k=1.

13. The computer program product of claim 11, wherein ACKs/NAKs of non-SPS data packets of the downlink data packets is/are placed from the first position of the N ACKs/NAKs.

* * * * *